United States Patent [19]

Bitzinger et al.

[11] Patent Number: 4,860,333

[45] Date of Patent: Aug. 22, 1989

[54] ERROR PROTECTED CENTRAL CONTROL UNIT OF A SWITCHING SYSTEM AND METHOD OF OPERATION OF ITS MEMORY CONFIGURATION

[75] Inventors: Rudolf Bitzinger, Munich; Walter Engl, Feldkirchen; Siegfried Humml; Klaus Schreier, both of Penzberg, all of Fed. Rep. of Germany

[73] Assignee: Oread Laboratories, Inc., Lawrence, Kans.

[21] Appl. No.: 24,749

[22] Filed: Mar. 11, 1987

[30] Foreign Application Priority Data

Mar. 12, 1986 [DE] Fed. Rep. of Germany ....... 3608245
Jul. 24, 1986 [DE] Fed. Rep. of Germany ....... 3625036

[51] Int. Cl.[4] .................... H04M 3/08; H04M 3/22
[52] U.S. Cl. ........................... 379/10; 371/10; 371/68; 379/279
[58] Field of Search ............... 379/279, 269, 290, 10, 379/11; 371/68, 10; 370/13

[56] References Cited

U.S. PATENT DOCUMENTS 3,882,455  5/1975  Heck et al. ..................... 371/68 X
4,366,535  12/1982  Cedolin et al. ................. 364/200
4,371,754  2/1983  De et al. ........................ 371/9

OTHER PUBLICATIONS

IBM Tech. Disc. Bulletin, vol. 10, No. 8, Jan. 1968, Hanson et al., "Data Processing Unit", pp. 1098 to 1100.
Patent specification P 33 34 792.1 (VPA 83 P 1722 US).

Primary Examiner—Thomas W. Brown
Attorney, Agent, or Firm—Burns, Doane, Swecker & Mathis

[57] ABSTRACT

A multiprocessor central control unit a switching system with a main memory (CMY) including, aside from a tolerable timing slip, synchronously parallel operated memory block pairs (MB3a/MB3b) during normal operation. The main memory (CMY), together with the central processors (BP, CP ... IOC ...), is connected to a central bus system (B:CMY0/CMY1). The data stored in parallel in the memory blocks of the memory block pairs (e.g., MB3a/MB3b) are EDC-protected. The processors have access to the memory block pairs (e.g. MB3a/MB3b). Upon the occurrence of a multiple error in an indicated second memory block (e.g., MB3b) of a memory block pair (MB3a/MB3b), the second memory block (MB3b) is isolated from the bus system (B:CMY0/B:CMY1) via an automatic memory configuration. The first memory block (MB3a) then performs the read and/or write operations alone, while from time to time the data stored in the second memory block (MB3b) are corrected by reading out of the first memory block (MB3a) and writing into the second memory block (MB3b), but during a concurrent write operation to the first memory block (MB3a) the data to be entered is also immediately written into the second memory block (MB3b) under the same address. A synchronously parallel driven configuration processor pair (SpP0/SpP1), the operation of which is EDC or parity-bit checked, is connected directly to the main memory (CMY) rather than over the central bus system for automatic memory configuration.

18 Claims, 1 Drawing Sheet

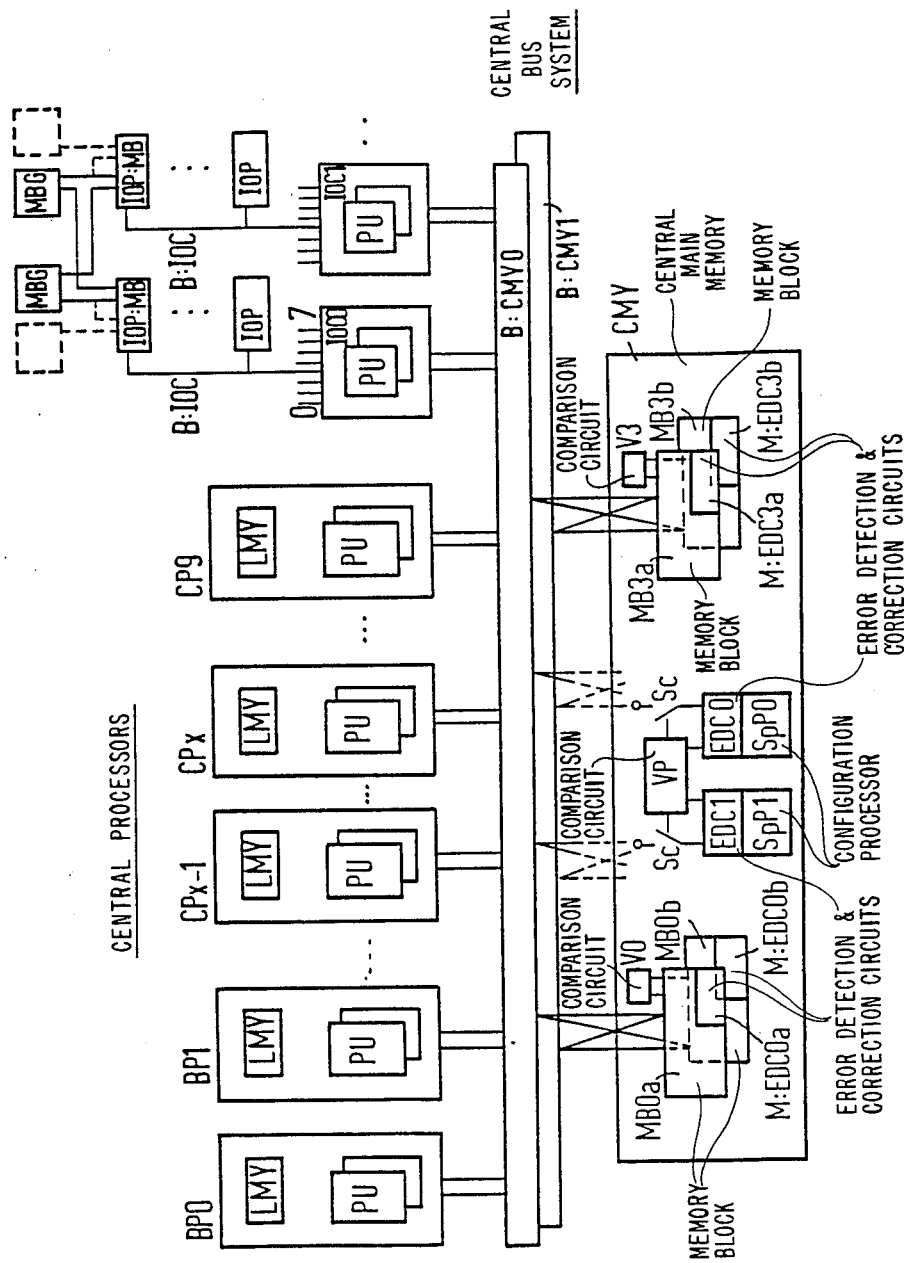

ERROR PROTECTED CENTRAL CONTROL UNIT OF A SWITCHING SYSTEM AND METHOD OF OPERATION OF ITS MEMORY CONFIGURATION

BACKGROUND OF THE INVENTION

This invention relates to multiprocessor central controllers, and it relates, more particularly, to an optimized memory configuration technique. This invention is related to the invention of German patent application P 33 34 773.5, which corresponds to U.S. patent application Ser. No. 651,954 filed Sept. 19, 1984, now abandoned.

Such a central control unit must be extremely tolerant of errors, that is, errors that occur should be rapidly detected, and defective sections of the central memory, or those sufficiently suspected of error, rapidly eliminated before additional errors result from the error which can affect the operation of the switching system. For that reason, the control units of the memory blocks of this central control unit and typically also the bus system and the central processors are redundant and protected against error, apart from a possible tolerable timing slip, and driven in precise synchronism in parallel.

Furthermore, such a central control unit should be capable of extremely high operational availability despite uninterrupted operation, that is any serious malfunctions must be limited to a few seconds or minutes per year, at most. In other words, the central control unit should have a minimum of downtime. In addition, the main memory of the central control unit should virtually never bring about a completely failure of the switching operation. The switching operation should also continue to operate with the highest possible tolerance for errors, during the failure and isolation of one of the, often diverse, elements of the central memory.

SUMMARY OF THE INVENTION

It is an object of the present invention to provide a further increase in the availability of the memory operation of the main memory of the central control unit.

It is a related object of the invention to further increase the memory operation of the main memory tolerance for errors and its operational availability.

It is a further object to increase the reliability of switching operations over a long term basis through utilization of the inventive principles disclosed herein.

In an illustrative embodiment of the present invention, at least a single integrated memory provides an automatic memory configuration operation by synchronous stepping operation of a parallel processor pair that is directly connected to a main memory. The processor pair thus provides redundancy in both structure and operation. In the processor pair, operation is also individually checked by using either an error detection code or parity bit checking. In addition, a processor comparator checks the operation continuously by comparing the individual machine instructions and/or the processing results of the associated memory configuration processor.

The central memory of the switching system is therefore controlled in accordance with the invention, particularly rapidly and with an especially high tolerance for errors, thus reliability and availability should be extremely high, through a dual integrated memory configuration processor, which for example, may be made using commercially available chips such as either 8-bit or also, for example, in 32-bit format processor chips which through special circuitry and special operational mode operate rapidly and above all dependably. Through this technique, one or a number of the central processors of the central control unit are no longer required as a rule, and accordingly the bus system is freed of access requirements upon the central memory for controlling the configuration of this central memory. The central processors are thus able to devote themselves fully to their own tasks, and accordingly, are even more accessible for their own assignments than previously. The accessibility of the bus system, in fact the availability of the entire central control unit is thus further enhanced.

The additional techniques discussed in relation to further aspects of the invention permit a further increase in the availability of the memory operation. In accordance with one aspect of the invention, the memory configuration provides operation, including refresh, fully automatically even during a malfunction in the operation of a memory block. In another aspect of the invention, subsequent diagnosis of the cause of errors is simplified so that the diagnosis may be performed in order to that possible scheduled repairs are carried out more purposefully. In a further aspect of the invention, the most reliable operation of the central memory is continued even during a failure of a memory block pair, even and when certain data stored there has been lost. In a further aspect of the invention, reliable memory control is maintained even during a failure of one of the memory configuration processors. Furthermore, the continued maintenance of reliable memory is administered even during failure of a memory configuration processor pair, while providing a further increase in the reliability and availability of the central memory.

BRIEF DESCRIPTION OF THE DRAWING

Features of the invention and additional objects of the invention will be more readily appreciated and better understood by reference to the following detailed description which should be considered in conjunction with the drawing.

The invention, its further development and advantages, is described in more detail with the aid of the illustrative embodiment shown in the sole FIGURE.

DETAILED DESCRIPTION

The central control unit example shown in the FIGURE very largely corresponds to the figures and descriptions in the German patent application previously referred to as P 33 34 773.5, also, moreover, to the illustrative central control unit embodiment, but with emphasis on other objects and/or aspects of this central control unit, described in the additional German patent applications P 33 34 792.1, P 33 34 765.4, P 33 34 766.2, P 33 34 797.2, and P 33 34 796.4. All these German patent applications correspond to U.S. patent application Ser. No. 657,954 filed Sept. 19, 1984.

Thus, it is not necessary to describe the construction and operation of the illustrative central control embodiment depicted in the sole FIGURE of the present application in complete and exhaustive detail. Instead it is adequate to consider here, only the particular details of construction related to the present invention, and the technique of optimizing its memory configuration.

The central control unit illustrated in the sole FIGURE of the present application demonstrates the extremely high error protected memory configuration processor pair SpP0/SpP1 as a characteristic feature of the central main memory CMY. In the embodiment illustrated, the processors include integral processor errors detection and correction code (EDC) circuits EDC0/EDC1 as well as additionally, an integral processor comparison circuit VP, for the comparison of the machine commands and/or the data of the two memory configuration processors.

Furthermore, the sole FIGURE also features four memory block pairs MB0a/MB-b ... MB3a/MB3b in the central main memory CMY, the memory control units of which, aside from a possible tolerable timing slip, are synchronously and precisely driven in parallel. These memory blocks are driven with extremely high error protection through integral memory block memory-EDC circuits M:EDC0a/M:EDC0b ... M:EDC-3a/EDC3b in the example shown, where in addition—despite possible EDC corrections—the addresses and/or the data to be written and/or read are compared with each other by means of memory block pair integral memory comparison circuits V0 ... V3 of the memory block pairs.

The sole FIGURE thus demonstrates an especially highly error protected, highly reliable and highly available multiprocessor central control unit for a switching system, for example, a telephone switching system with four synchronously driven memory blocks pairs MB0a/MB0b ... MB3a/MB3b, operated in parallel, that are themselves error protected during normal operation, apart from a possible tolerable timing slip, which consist of a first (a) and a second (b) memory block. These memory block pairs MB are connected to the error protected synchronously driven central bus system B:CMY0/B:CMY1 which is itself also redundant and synchronously driven in parallel, apart from a possible tolerable timing slip, to form the principal components of the central main memory CMY. In addition, a number of different central processors designated BP0, BP1, IOC0, IOC1 ... CP9, IOC0, IOC1 ... for processing momentary switching assignments are connected in parallel to the bus system B:CMY. In addition, these central processors BP, CP, IOC are themselves also redundantly configured and error protected to be operated synchronously in parallel apart from a possible timing slip.

At least a large number of the central processors BP, CP, IOC normally have access, for example because of intentional limitation of the transmittable memory addresses from the respective processors, to only a part of the memory locations of the central memory register CMY, thus, for example to one of the memory sections in each of the two memory blocks of at least one of the memory block pairs, for example, MB3a/MB3b, for a read-out and/or write operation, for which reason identical data is normally stored in the respective addressable memory sections of the two memory blocks of the memory block pairs.

During off-normal operating periods of a memory block pair, for example, the memory block pair MB3a/MB3b—that is after a multiple error has been detected through one of its memory-EDC circuits, for example M:EDC3b in an indicated second memory block, thus MB3b here which is not immediately correctable—the memory block MB3b that is strongly suspect of error is isolated, in accordance with the aforementioned German patent document P 33 34 773.5 from the bus system B:CMY0/B:CMY1 through an automatic memory configuration, whereby the other, first memory block, thus MB3a, carries on the read-out and/or write operation with the respective central processors BP, CP, IOC, from here on.

During this off-normal period of operation, either immediately after this isolation of the second memory block MB3b, or at least subsequent to its repair, the data in the memory block MB3b is automatically corrected, from time to time, through a triggered re-loading attempt by means of an address generator contained, for example, in the memory configuration processor pair SpP0/SpP1 or in the bus system B:CMY0/B:CMY1. The re-loading is achieved through read-out of the first memory block MB33 of the memory block pair MB3a/MB3b and by writing the data read from the first memory block MB3a into the second memory block MB3b, insofar as the second memory block MB3b now operates error free, whereby during this re-loading of the second memory block during a concurrently conducted write operation to the first memory block MB3a, the same data written into the first memory block is also immediately written into the second memory block MB3b under the same address. By means of a trial run conducted during the re-loading attempt, or after the reloading attempt of the respective memory block pair MB3a/MB3b, a test may be made through its memory-EDC circuit M:EDC3a/M:EDC3b as well as through its memory comparison circuit V3 to determine whether the re-loading was successful or additional repair or a repeated re-loading attempt is necessary.

The memory integrated micro-synchronously parallel driven memory configuration processor pair SpP0/SpP1 serving for automatic memory configuration is thus connected directly to the main central memory register CMY and perhaps located there directly to the lines—in order to minimize the signal propagation times—and thus operates directly on the central main memory CMY rather than over the central bus system B:CMY0/B:CMY1, and there, most importantly also directly on the control of the memory blocks MB0a ... MB3b. Accordingly, the central bus system B:CMY0/B:CMY1 and the central processors BP, CP, IOC are relieved of memory configuration assignments. The operation of the memory configuration processor pairs SpP0/SpP1 are themselves checked as well, through an integrated processor-EDC circuit EDC0, EDC1 or processor parity-bit circuit and moreover additionally and continuously checked through the processor comparison circuit of the processor despite this integrated EDC-code or parity-bit checking. This memory integrated malfunction protected memory configuration processor pair SpP0/SpP1, or a number of such memory integrated configuration processor pairs provide a corresponding increase in the reliability of the central main memory because of its extremely malfunction protected operation.

This memory configuration processor pair SpP0/SpP1, or the memory configuration processor pairs, preferably also controls the timely processing of all refresh cycles for the central memory blocks MB, in any case, at least as long as the respective configuration processor pair operates malfunction free in accordance with its own checking circuits procedure. In addition, during the refresh cycle, this configuration processor pair directly or indirectly controls the checking and correction of the stored data being read during the refresh cycle—preferably through the integral memory-EDC circuits M:EDC0a ... M:EDC3b. More particularly, it controls the isolation of this memory block, e.g. MB3b from the bus system B:CMY0/B:CMY1 as well as the related off-normal operation for re-loading attempts for re-loading this isolated memory block MB3b as soon as a multiple error has been detected through its memory-EDC circuit, M:EDCb, that is not immediately correctable. Furthermore, the configuration processor pair controls the reconnection of the respective memory block MB3b to the bus system B:CMY0/B:CMY1, after the successful completion of the reloading, and the transition of both memory blocks of the memory block pair MB3a/MB3b to provide their normal synchronous parallel operation, thus the transition to the normal operating mode.

The error diagnosis and the purposeful possibly necessary repair of the central memory CMY, such as single memory blocks MB and/or more particularly their EDC circuits M:EDC or comparison circuits V/VP, is simplified, for example, in that at least one of the memory configuration processors SpP0/SpP1, in a separate register, or perhaps also in a particular memory area employed as a register, for example in sections of MB0a/MB0b, logs an indication of the cause of the error leading to the isolation from the bus system B:CMY0/B:CMY1, and/or an indication of the respective isolated element, thus, for example, of a specific memory block such as MB3b, for example, and/or a more or less precise indication of a command through the operation of which the respective error appeared.

If, during operation, such as during read-out, for example as early as refresh, there is evident danger that an element of the central memory CMY, thus for example a memory block pair such as MB3a/MB3b, has become defective in a non-repairable fashion—in other words if for example, the data stored in the two memory blocks of this memory block pair are additionally compared to each other by means of their integral memory comparison circuit, V3 for example, and mismatches remain despite EDC checking and despite eventual EDC-correction—in this situation the appropriate command indicative of read-out, for example, may subsequently be repeated preferentially by means of the memory configuration processor pair SpP0/SpP1. It is then often the case that the error has suddenly disappeared and that normal operation can then be continued. After a repeated appearance of the mismatch an alarm may be triggered in such a way, for example, that the respective element for example, the respective memory block pair MBx, is now finally isolated from the central bus system B:CMY0/B:CMY1, and/or internally from its memory environment in the central memory, and if possible immediately replaced—preferably again with the aid of the memory configuration processor-pair—with a back-up element,—thus, for example, with a back-up memory block pair—and, should the back-up element involved be a memory block pair, re-loaded, as far as possible, and as required.

In accordance with the invention, the central main memory CMY, is capable of remaining fully operational even in the event of a breakdown of one of the memory configuration processors—often without any significant loss: After the detection of a multiple error in the respective memory configuration processor SpP through one of the processor-EDC circuits, EDC1 for example, that it cannot immediately correct, the associated memory configuration processor, hence SpP1 for example, can thus be switched off and the other faultless memory configuration processor SpP0 will assume the memory configuration alone.

In addition, after the detection through one or both of the processor-EDC circuits EDC0/EDC1 of a multiple error that is not immediately correctable, the respective memory configuration processor pair SpP0/SpP1 can be switched off, and replaced by switching on an immediately, fully operational back-up configuration processor pair. Furthermore, after the detection of an error through a configuration processor comparison circuit VP—for example, despite correction through an associated processor-EDC circuit, for example EDC1—the entire associated memory configuration processor pair SpP0/SpP1 can be switched off, and immediately replaced by switching on a fully operational back-up memory configuration processor pair. Alternatively, this control of the replacement can be brought about through the switched off configuration processor pair itself, despite the fact that they are switched off.

It is desirable and advantageous to test the circuits of the central memory employed for failure detection, that is the various EDC circuits and comparison circuits of the memory blocks and of the configuration processor pair, for error free operation, from time to time. For this purpose a previously prepared special test program can be called up from the memory configuration processor pair SpP0/SpP1 and run, and the respective defective circuit EDC/V replaced by a back-up circuit on demand.

There has thus been shown and described a novel central control unit for a switching system wherein a redundant memory configuration fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

We claim:

1. An error protected, high availability multiprocessor central control unit for a switching system of the type particularly suitable for a telephone system, the central control unit comprising:
 (a) a central main memory having a redundant configuration including at least one memory block pair comprising a first memory block and a second memory block operating in synchronous step in parallel during normal periods of operation, apart from a possible tolerable timing slip;
 (b) the central main memory and a plurality of different central processors which process momentary switching assignments and access memory block pairs, are connected in parallel to a central bus system,
 the central main memory including memory error detection and correction (EDC) code circuits individually associated with the single memory blocks, for protecting against errors according to an EDC Code while data are stored in both memory blocks of each memory block pair,
 whereby at least some of the processors have access to at least one memory section of at least one of the memory block pairs for a read-out and write operation;

(c) an associated memory-EDC circuit in an indicated second memory block of a memory block pair, after detecting during off-normal periods of operation a multiple, not immediately correctable failure the second memory block is isolated from the bus system through at least one memory configuration unit, and the other, first memory block of this memory block pair then carries out the read-out and/or write operation with the respective central processors;

the memory configuration unit, during isolation, controls correction of the data stored in the second memory block step by step, at least subsequent to repair of the second memory block insofar as the second memory block now operates error free, an address generator generates an address which triggers an automatic re-loading attempt during which said address generator starts reading out correct data under said address from the first memory block of the respective block pair and starts writing the read-out correct data into the second memory block under the same address, whereby, in the event that during this re-loading attempt of the second memory block a write operation into the first memory block is inserted and conducted currently, the same data written into the first memory block is also immediately written into the second memory block under the same address; and (d) the memory configuration unit including a configuration processor pair, directly connected to the central main memory instead of being connected by the central bus system to the central main memory, each configuration processor of said configuration processor pair controlled by commands and generating processing results, both configuration processors of the configuration processor pair operating in synchronous step in parallel apart from a possible tolerable timing slip, wherein both configuration processors comprise respective processor-EDC circuits and/or processor parity-check circuits for error detection for individually checking each processor of the processing pair, and wherein at least one processor comparison circuit continuously compares the individual commands controlling the configuration processor and/or the individual processing results of both configuration processors.

2. A method of operating a memory configuration unit structured in accordance with claim 1, while the configuration processor pair remains malfunction-free in terms of said error detection and said command and processing results comparison, the method comprising the steps of:

(a) starting refreshing of the memory blocks in cycles, said cycles including reading stored data from said memory blocks and writing the same data back into said memory blocks, by the configuration processor pair, checking and correcting the stored data read during refresh cycles by means of the memory-EDC circuits;

(b) after detecting a multiple error in the respective memory block through one of the memory-EDC circuits not immediately correctable by it, isolating this memory block from the bus system by the respective configuration processor pair and conducting off-normal operation including a procedure for trying to re-load the isolated memory block; and (c) after completion of the re-loading, transitioning to normal operation by re-connecting the isolated re-loaded memory block to the bus system by the configuration processor pair, to permit the parallel synchronous operation of both memory blocks of the respective memory block pairs, apart from a possible tolerable timing slip.

3. A method in accordance with claim 2, further including logging an indication in a predetermined memory area by at least one of the configuration processors, the logging being an indication of the error leading to the isolation from the bus system by further logging eventually an indication of the address and for the isolated memory block where the respective error was detected.

4. A method in accordance with claim 2, additionally comparing stored data in both of the memory blocks of a memory block pair with each other in a memory comparison circuit and repeating the memory reloading procedure in the event of a mismatch of the compared data, for example of the read data during normal operation periods, at least during reading or refresh.

5. A method in accordance with claim 4, further including the step of isolating the respective memory block pair from the central bus system and replacing it with a back-up memory block pair after the repeated appearance of a mismatch by the respective configuration processor pair.

6. A method in accordance with claim 2, wherein after an error is detected by one of the processor-EDC circuits and/or processor parity-check circuits that is not immediately correctable by it, switching off the associated configuration processor, and forming a memory configuration by the other configuration processor of the respective configuration processor pair.

7. A method in accordance with claim 2, wherein after an error is detected by one of the processor-EDC circuits and/or processor parity-check circuits that is not immediately correctable by it, switching off the respective configuration processor pair and switching on a back-up configuration processor pair for replacement.

8. A method in accordance with claim 2, wherein after an error is detected by a processor comparison circuit switching off the associated configuration processor, and replacing through switching on a back-up configuration processor pair.

9. A method in accordance with claim 2, further including requesting and processing by the configuration processor pair a special test program, stored in a separate memory area for a test of circuits which serve for error detection.

10. An error protected, highly reliable multiprocessor central control unit for a switching system, comprising:
a central bus system;
a plurality of central processors, connected in parallel to said central bus system, for processing momentary switching assignments; and
a central memory system, connected to said central bus system in parallel with said plurality of central processors, having a redundant configuration and including:
a memory block pair, comprising: a first and a second memory block operating in synchronous step in parallel during normal periods of operation, apart from a possible tolerable timing slip; and a first and a second memory error detection and correction circuit associated with said first and second memory blocks, respectively, for protecting against errors while data are stored in said first and second memory blocks; and a memory configuration unit, connected to said memory block pair exclusive of said central bus system, and comprising: a first and a second configuration processor, operating in synchronous step in parallel, apart from a possible tolerable timing slip, each configuration processor controlled by commands and generating processing results; a first and a second processor error detection and correction circuit, associated with said first and second configuration processors, respectively, for individually checking each of said first and second processors; and a processor comparison circuit for continuously comparing the respective commands and/or processing results of said first and second processors; wherein:

said central processors access at least a section of said memory block pair for successive read-out and write operations through said central bus system; and said memory configuration unit isolates one of said memory blocks from said central bus system in response to an indication from the memory error detection and correction circuit associated with said one of said memory blocks indicating a not-immediately-correctable failure of said one of said memory blocks, whereby the other one of said memory blocks performs said read-out and write operations with said central processors; and said memory configuration unit control correction of the data stored in said one of said memory blocks while said one of said memory blocks is isolated from said central bus system, after said one of said memory blocks is repaired, by reading out correct data from said other one of said memory blocks and writing said correct data into said one of said memory blocks; wherein, if, during this correction, a write operation to said other one of said memory blocks occurs, the data written into said other one of said memory blocks is immediately written into said one of said memory blocks.

11. A method of operating an error protected, highly reliable multiprocessor central control unit for a switching system, said central control unit including: a central bus system; a plurality of central processors, connected in parallel to said central bus system, for processing momentary switching assignments; and a central memory system, connected to said central bus system in parallel with said plurality of central processors, having a redundant configuration and including: a memory block pair, comprising: a first and a second memory block, periodically requiring refreshing, and operating in synchronous step in parallel during normal normal periods of operation, apart from a possible tolerable timing slip; and a first and a second memory error detection and correction circuit associated with said first and second memory blocks, respectively, for protecting against errors while data are stored in said first and second memory blocks; and a memory configuration unit, connected to said memory block pair exclusive of said central bus system, and comprising: a first and a second configuration processor, operating in synchronous step in parallel, apart from a possible tolerable timing slip, each configuration processor controlled by commands and generating processing results; a first and a second processor error detection and correction circuit, associated with said first and second configuration processors, respectively, for individually checking each of said first and second processors; and a processor comparison circuit for continuously comparing the respective commands and/or processing results of said first and second processors; said method comprising the steps of:

(a) starting refreshing of said first and second memory blocks in cycles by means of said memory configuration unit;

(b) checking and correcting the stored data read during refresh cycles by means of said first and second memory error detection and correction circuits;

(c) if a not-immediately-correctable error is detected by a one of said first and second memory error detection and correction circuits in said checking and correcting step, beginning off-normal operation by isolating the one of said memory blocks associated with said one of said first and second memory error detection and correction circuits from said central bus system by means of said memory configuration unit;

(d) reloading said isolated one of said first and second memory blocks with data from the other one of said first and second memory blocks, by means of said memory configuration unit; and (e) resuming normal operation after completion of said reloading step, by reconnecting said one of said first and second memory blocks to said central bus system by means of said memory configuration unit to resume said parallel synchronous operation of said memory block pair, apart from said possible tolerable timing slip.

12. The method in accordance with claim 2, further including after said isolating step, the step of:

logging by means of said memory configuration unit, in a predetermined portion of said memory block pair, information representing the cause of said error, the identity of said one of said memory blocks and the location in said one of said memory blocks where said error occurred.

13. The method in accordance with claim 11, wherein:

said checking and correcting step further comprises the step of additionally comparing stored data in both of the memory blocks of a memory block pair with each other to find a memory data mismatch; and said reloading step is performed if said comparing step finds a mismatch.

14. The method in accordance with claim 13, wherein:

said memory block pair further comprises a memory comparison circuit;

said central memory system further comprises a backup memory block pair; and said method further comprises, after said additional comparing step, the step of:

if repeated mismatches are found in said additional comparing step, isolating said memory block pair from said central bus system and connecting said backup memory block pair to said central bus system by means of said memory configuration unit.

15. The method in accordance with claim 11, further comprising the step of:

if a not-immediately-correctable error is detected by one of said processor error detection and correction circuits, switching off the configuration processor associated with said one of said processor error detection and correction circuits and forming a memory configuration by the other configuration processor of the respective configuration processor pair.

16. The method in accordance with claim 11, wherein said memory configuration unit further includes a third and a fourth configuration processor; said method further including the step of:
if a not-immediately-correctable error is detected by one of said processor error detection and correction circuits, switching off said first and second configuration processors and switching on said third and fourth configuration processors as replacement.

17. The method in accordance with claim 11, wherein said memory configuration unit further comprises a third and a fourth configuration processor, said method further comprising the step of:
if a mismatch is detected by said processor comparison circuit, switching off said first and second configuration processors and switching on said third and fourth configuration processors as replacement.

18. The method in accordance with claim 11, further including the step of:
requesting and processing a special test program, by means of said memory configuration unit, stored in a predetermined memory area in said memory block pair, to test said memory and processor error detection and correction circuits and said processor comparison circuit.

* * * * *

UNITED STATES PATENT AND TRADEMARK OFFICE
CERTIFICATE OF CORRECTION

PATENT NO. : 4,860,333
DATED : August 22, 1989
INVENTOR(S) : Rudolf Bitzinger et al It is certified that error appears in the above-identified patent and that said Letters Patent is hereby corrected as shown below:

On the title page assignee should read

--(73) Assignee: Siemens Aktiengesellschaft, Berlin and Munich, Germany--.

Signed and Sealed this

Tenth Day of April, 1990

*Attest:*

HARRY F. MANBECK, JR.

*Attesting Officer*  *Commissioner of Patents and Trademarks*